United States Patent
Bass et al.

(10) Patent No.: US 7,140,179 B2
(45) Date of Patent: Nov. 28, 2006

(54) VALVE

(75) Inventors: Gary S. Bass, Independence, KY (US); Ronald J. Mulford, Aurora, IN (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 121 days.

(21) Appl. No.: 10/985,600

(22) Filed: Nov. 10, 2004

(65) Prior Publication Data

US 2006/0096285 A1    May 11, 2006

(51) Int. Cl.
*F16D 39/00* (2006.01)

(52) U.S. Cl. .................. 60/493; 91/448; 137/625.24

(58) Field of Classification Search ................ 137/613, 137/615, 625.16, 625.24, 625.21; 60/493; 91/445, 448; 173/169; 251/309
See application file for complete search history.

(56) References Cited

U.S. PATENT DOCUMENTS

| | | |
|---|---|---|
| 574,003 A | 12/1896 | Rinsche |
| 635,422 A | 10/1899 | Burns |
| 724,811 A | 4/1903 | Clement |
| 745,900 A | 12/1903 | Payton |
| 776,671 A | 12/1904 | Maximilian |
| 810,603 A | 1/1906 | Badger |
| 839,031 A | 12/1906 | Prindle |
| 855,975 A | 6/1907 | Prindle |
| 909,740 A | 1/1909 | Beckfield |
| 910,224 A | 1/1909 | Norling |
| 946,368 A | 1/1910 | Jones |
| 974,375 A | 11/1910 | Gilman |
| 1,089,243 A | 3/1914 | Maximilian |
| 1,238,255 A | 8/1917 | Burkel |
| 1,297,679 A | 3/1919 | Haeseler |
| 1,590,269 A | 6/1926 | Wade |
| 1,594,964 A | 8/1926 | Jimerson |
| 1,669,233 A | 5/1928 | Duchesne |
| 1,674,579 A | 6/1928 | vanHamersveld |
| 1,704,399 A | 3/1929 | Meunier |
| 1,713,310 A | 5/1929 | vanHamersveld |
| 1,757,731 A | 5/1930 | Norling |
| 1,771,238 A | 7/1930 | Walsh |
| 1,781,130 A | 11/1930 | Shaff |
| 1,809,938 A * | 6/1931 | Hohulin .................. 137/625.24 |
| 1,860,736 A | 5/1932 | Gartin |
| 1,921,753 A | 8/1933 | Hoffman |
| 1,978,118 A | 10/1934 | Stevens |
| 1,999,369 A | 4/1935 | Norling |
| 2,104,468 A | 1/1938 | Osborn |

(Continued)

OTHER PUBLICATIONS

Printout from Cooper Tools web site at www.coopertools.com, one page entitled "Impact Wrenches", showing Master Power model MP2270 impact wrench, copyright 2003.

(Continued)

*Primary Examiner*—F. Daniel Lopez
(74) *Attorney, Agent, or Firm*—Jones Day

(57) ABSTRACT

An apparatus comprises a valve body having a cylindrical bore centered on an axis. A cylindrical core extends axially within the bore and is fixed relative to the valve body. A sleeve within the bore extends circumferentially about the core and is rotatable about the axis relative to the core. A passage extends radially through the sleeve and provides a radial flow path from the core through the passage to the valve body. Alignment of the passage is circumferentially selectable by rotation of the passage with the sleeve about the axis.

8 Claims, 10 Drawing Sheets

U.S. PATENT DOCUMENTS

| | | |
|---|---|---|
| 2,177,158 A | 10/1939 | Smith, Jr. |
| 2,197,626 A | 4/1940 | Scheven |
| 2,221,100 A | 11/1940 | Lear |
| 2,233,163 A | 2/1941 | Fosnot |
| 2,374,019 A | 4/1945 | Kahler |
| 2,413,542 A | 12/1946 | Butts |
| 2,476,632 A | 7/1949 | Shaff |
| 2,493,957 A | 1/1950 | Fitch |
| 2,542,038 A | 2/1951 | Lewis |
| 2,566,183 A | 8/1951 | Forss |
| 2,585,975 A | 2/1952 | Terry |
| 2,607,559 A | 8/1952 | Forss |
| 2,655,901 A | 10/1953 | Brown |
| 2,703,557 A | 3/1955 | Polki |
| 2,751,922 A | 6/1956 | Miller |
| 2,784,818 A | 3/1957 | Maurer |
| 3,093,360 A | 6/1963 | Krouse |
| 3,326,240 A | 6/1967 | McConnaughay |
| 3,352,368 A | 11/1967 | Maffey |
| 3,398,802 A | 8/1968 | Clark |
| 3,402,778 A | 9/1968 | Carter |
| 3,477,523 A | 11/1969 | Lewis |
| 3,620,311 A | 11/1971 | Brown |
| 3,635,605 A | 1/1972 | Hall |
| 3,718,313 A | 2/1973 | Miller |
| 3,724,563 A | 4/1973 | Wickham |
| 3,777,493 A * | 12/1973 | Graham .................. 60/493 |
| 3,833,068 A | 9/1974 | Hall |
| 3,924,961 A | 12/1975 | Hess |
| 3,989,113 A | 11/1976 | Spring |
| 4,016,940 A | 4/1977 | Spring |
| 4,236,589 A | 12/1980 | Griffith |
| 4,265,322 A | 5/1981 | Emonet |
| 4,398,560 A | 8/1983 | Black |
| 4,708,210 A | 11/1987 | Rahm |
| 4,844,177 A | 7/1989 | Robinson |
| 5,092,410 A | 3/1992 | Wallace |
| 5,303,781 A | 4/1994 | Lin |
| 5,377,769 A | 1/1995 | Hasuo |
| 5,417,294 A | 5/1995 | Suher |
| 5,609,300 A | 3/1997 | Conatser |
| 5,639,219 A | 6/1997 | Conatser |
| 5,797,462 A | 8/1998 | Rahm |
| 5,913,370 A | 6/1999 | Chapelle |
| 5,918,686 A | 7/1999 | Izumisawa |
| 5,992,539 A | 11/1999 | Lin |
| 6,047,780 A | 4/2000 | Lin |
| 6,062,323 A | 5/2000 | Pusateri |
| 6,158,528 A | 12/2000 | Izumisawa |
| 6,234,256 B1 | 5/2001 | Kettner |
| 6,250,399 B1 | 6/2001 | Giardino |
| 6,443,239 B1 | 9/2002 | Izumisawa |
| 6,527,060 B1 | 3/2003 | Schoeps |
| 6,561,284 B1 | 5/2003 | Taga |
| 6,578,645 B1 | 6/2003 | Fahr |
| 6,585,060 B1 | 7/2003 | Iritani |
| 6,634,438 B1 | 10/2003 | Pusateri |
| 6,695,072 B1 | 2/2004 | Izumisawa |
| 6,708,779 B1 | 3/2004 | Taga |
| 2002/0112867 A1 | 8/2002 | Tseng |
| 2003/0010513 A1 | 1/2003 | Taga |
| 2003/0037939 A1 | 2/2003 | Taga |
| 2003/0121680 A1 | 7/2003 | Izumisawa |
| 2003/0226674 A1 | 12/2003 | Putney |
| 2004/0060718 A1 | 4/2004 | Izumisawa |

OTHER PUBLICATIONS

Printout from Campbell Hausfeld web site at www.chpower.com, one page entitled "Campbell Hausfeld—Built to Last—Catalog" and subtitled "Swivel Connector Model: MP103800AV"; undated.

Printout from Campbell Hausfeld web site at www.chpower.com, one page entitled "Campbell Hausfeld—Built to Last—Catalog" and subtitled "3/8" Butterfly Impact Wrench Model: MP101700AV; undated.

Printout from Jack-X-Change web page at http://www.jackxchange.com/products/IR216.cfm, showing Ingersoll Rand Model IR216 impact wrench; copyright 2004.

* cited by examiner

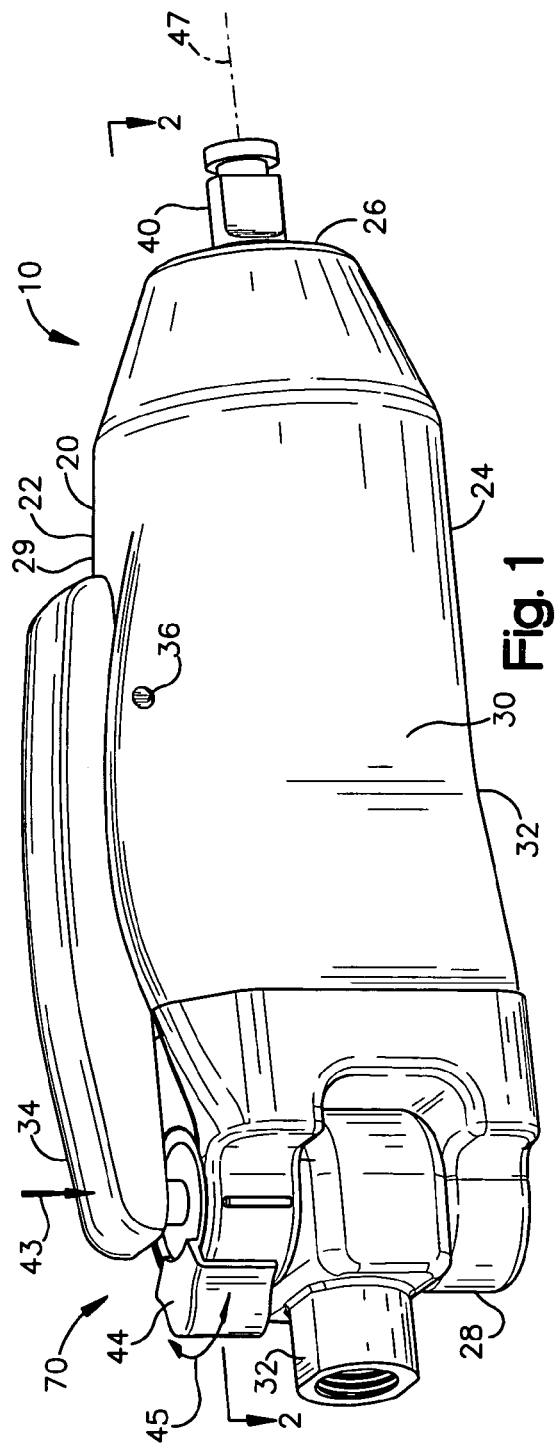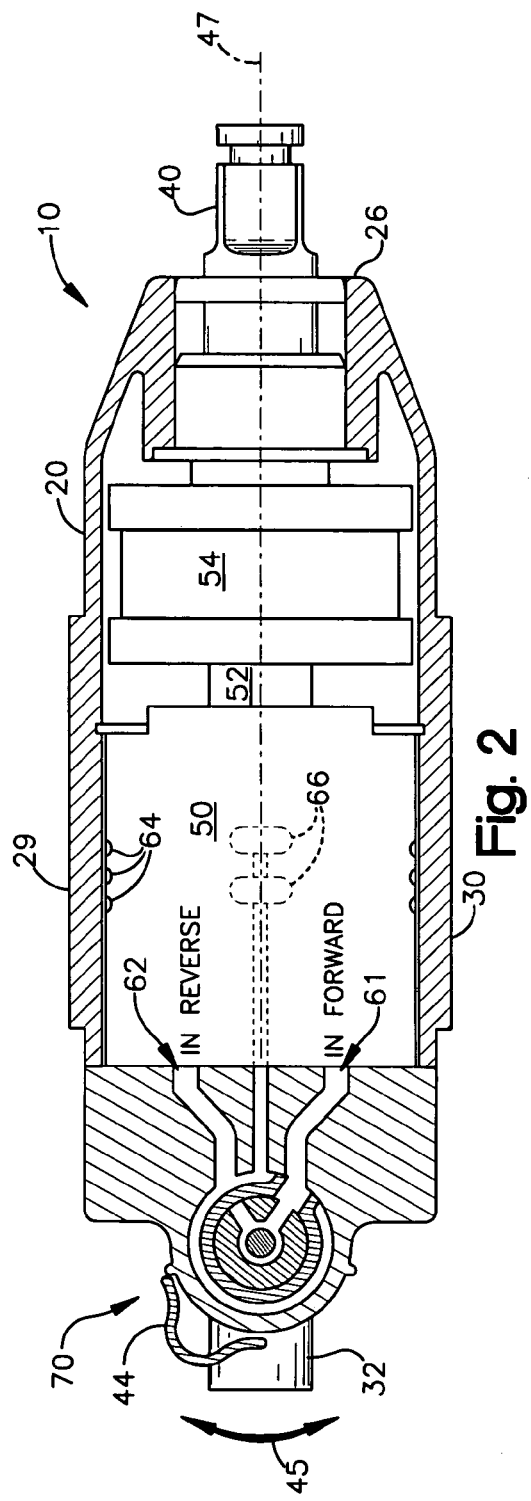

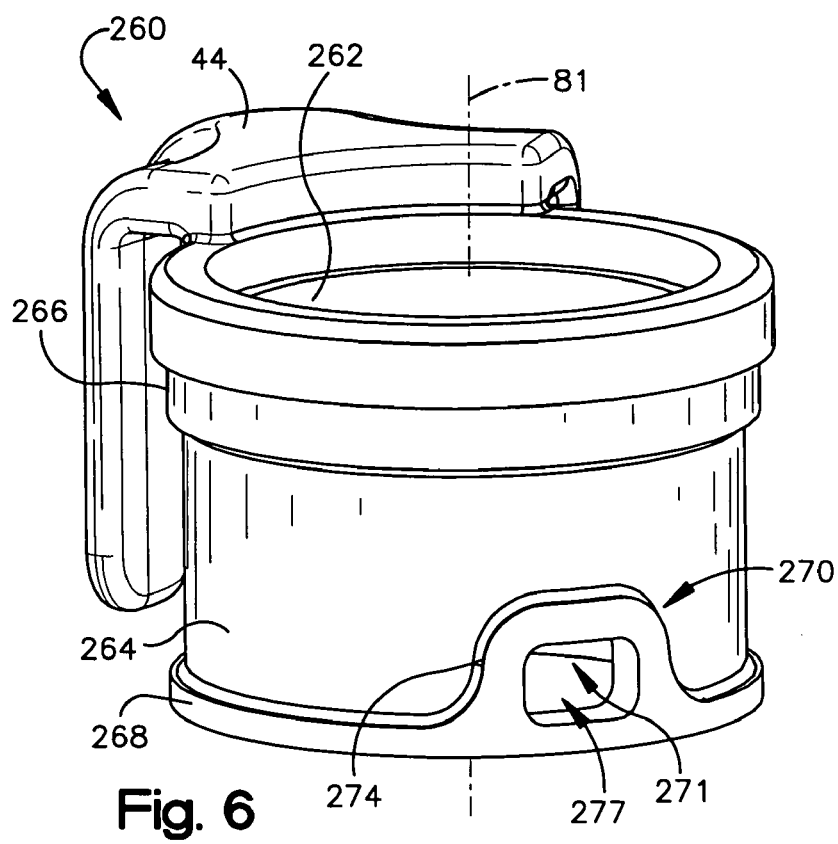
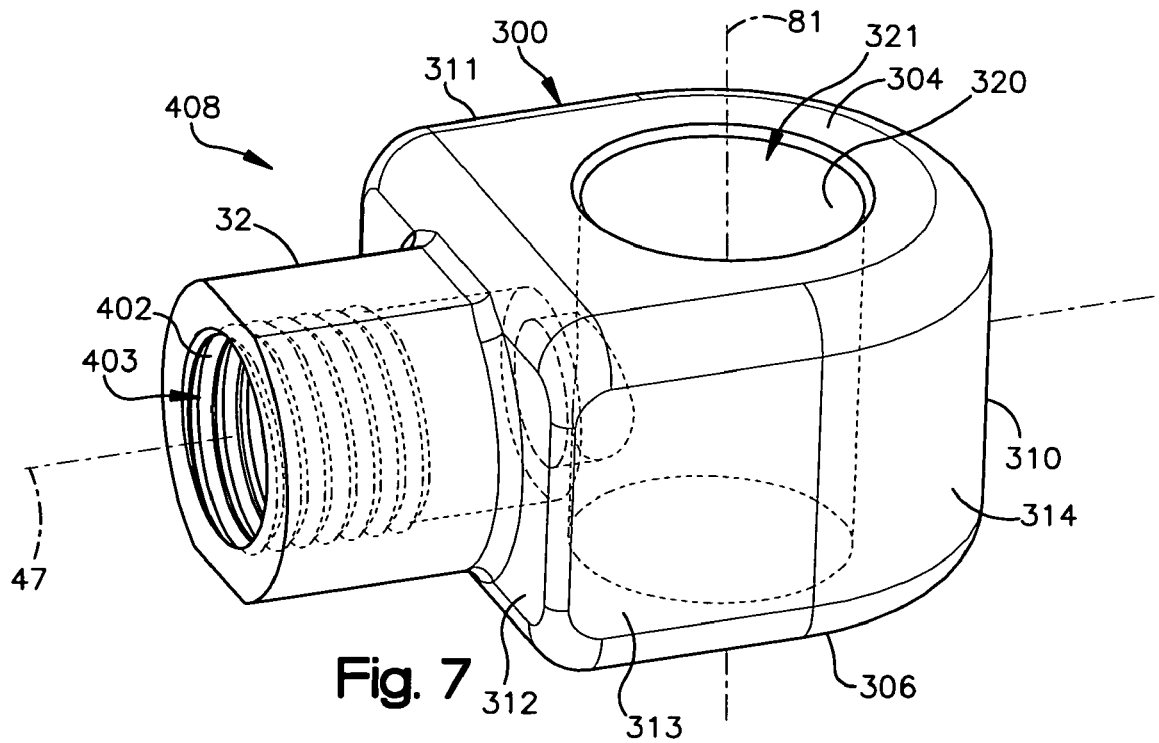

VALVE

TECHNICAL FIELD

This application relates to valves for controlling fluid flow.

BACKGROUND

A pneumatic hand tool has a tool housing and an shaft projecting from the housing. The tool further has an actuating lever and a switching arm connected to the housing. Depressing the lever causes the shaft to rotate. The direction of the rotation is selected using the switching arm.

SUMMARY

An apparatus comprises a valve body having a cylindrical bore centered on an axis. A cylindrical core extends axially within the bore and is fixed relative to the valve body. A sleeve within the bore extends circumferentially about the core and is rotatable about the axis relative to the core. A passage extends radially through the sleeve and provides a radial flow path from the core through the passage to the valve body. Alignment of the passage is circumferentially selectable by rotation of the passage with the sleeve about the axis.

Preferably, a switching arm is fixed to the sleeve and extends outward from the valve body to enable the sleeve to be rotated by manually rotating the arm. A tool housing can be interconnected along with the body, the core and the sleeve as parts of a unitary handheld tool, wherein the switching arm extends outward from the valve body and the housing to enable the sleeve to be rotated by manually rotating the arm.

Also, preferably, the body includes a cylindrical body surface that defines the bore and that has first and second body ports circumferentially spaced apart. The sleeve is rotatable between a first position providing a first radial flow path extending from the core to the first body port and a second position providing a second radial flow path extending from the core to the second body port.

The sleeve can include a radially inner surface engaging the core, a radially outer surface facing and spaced from the body surface, and a passage structure surrounding the passage from the core to the body surface. The sleeve is further rotatable to a third position in which a circumferential flow path extends from the first body port to the second body port, between the sleeve outer surface and the body surface.

BRIEF DESCRIPTION OF THE DRAWINGS

FIG. 1 is a perspective view of a pneumatic hand tool;

FIG. 2 is a partially schematic sectional view of the tool taken at line 2—2 of FIG. 1;

FIG. 6 is a perspective view of a sleeve shown in FIG. 5;

FIG. 7 is a perspective view of an inlet structure shown in FIG. 5;

DESCRIPTION

Figure 3:
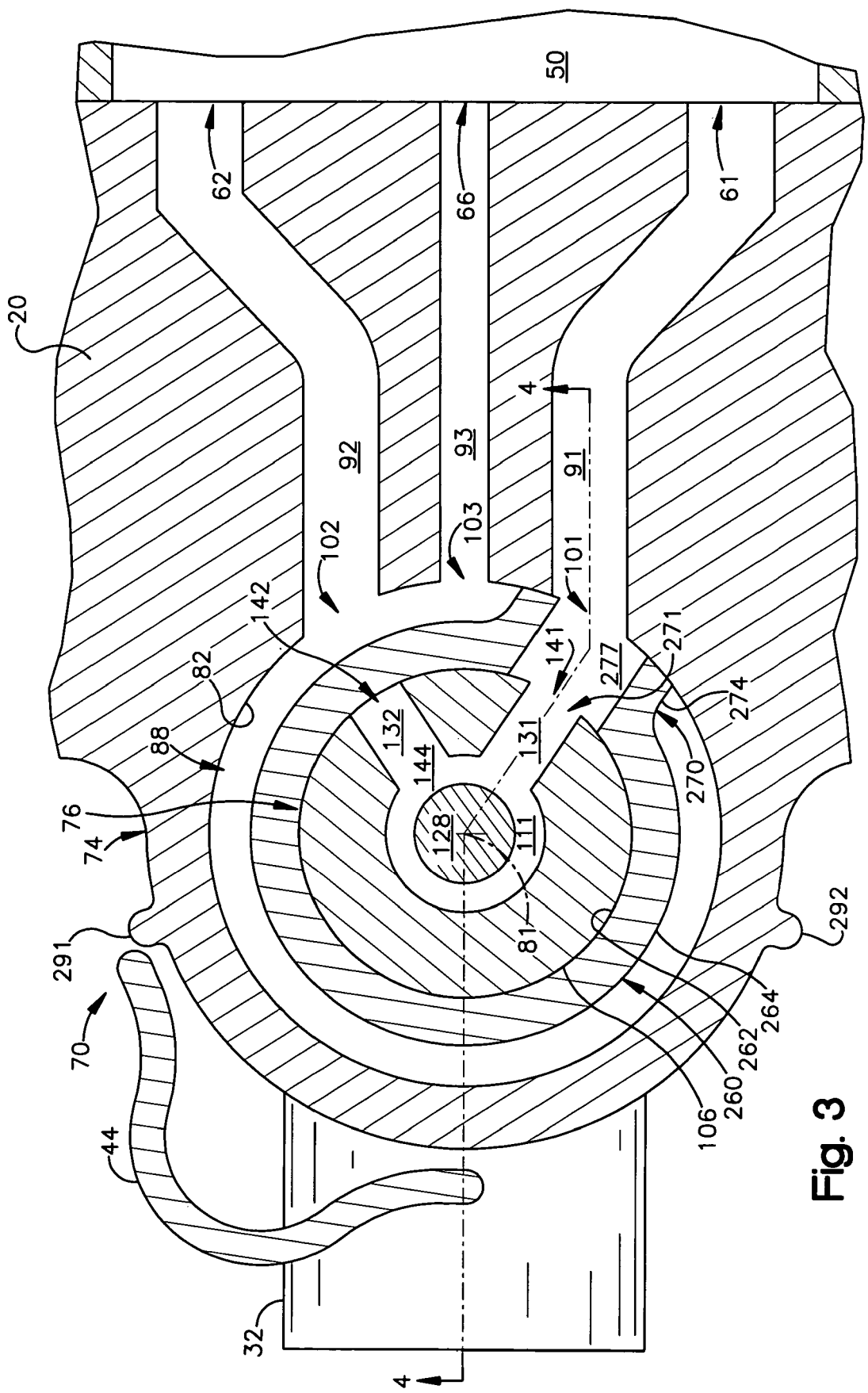
FIG. 3 is an expanded view of a rear portion of FIG. 2.

The apparatus 10 shown in FIG. 1 has parts that are examples of the elements recited in the claims.

The apparatus 10 is a pneumatic tool, in this example a handheld impact wrench. It includes a handheld housing 20, with a top 22, a bottom 24, front and rear ends 26 and 28, and two opposite sides 29 and 30. An air inlet nozzle 32, projecting rearward from the rear end 28, receives pressurized air to power the tool 10. An activation lever 34 at the top 22 of the housing 20 is pivotably attached to the housing 20 by a pin 36. An anvil 40 protrudes from the front end 26 of the housing 20. Depressing the lever 34, as indicated by arrow 43, causes the anvil 40 to rotate. The direction of the rotation is selected using a switching arm 44, which is rotatable as indicated by arrow 45.

The housing 20 has a longitudinal axis 47. As mentioned above, the housing 20 also has a top 22 and a bottom 24. The designation of "top" and "bottom" is made with respect to the orientation of the tool 10 as it is portrayed in FIG. 1. However, the tool 10 can be used in other orientations. For example, the tool 10 can be oriented with the front end 26 directed downward. Then, the "top 22" and "bottom 24" of the housing 20 would be facing sideways. Similarly, the tool 10 can be used in an orientation vertically reversed from that shown in FIG. 1. Then, the "top 22" of the housing 20 would be facing downward.

As shown schematically in FIG. 2, the anvil 40 rotates about the longitudinal axis 47 of the housing 20. The anvil 40 is indirectly driven by an air motor 50 within the housing 20. This is achieved by the motor 50 rotating a motor shaft 52, which drives a rotary impact hammer 54 within the housing 20 that, in turn, rotates the anvil 40. The motor 50 further has first and second inlets 61 and 62 for receiving the pressurized air. Channeling the pressurized air through the first and second motor inlets 61 and 62, respectively, powers the motor 50 to rotate the shaft 52, and thus the anvil 40, in forward and reverse directions. The "forward" direction is an arbitrary rotational direction, and the "reverse" direction is a rotational direction opposite the forward direction. The air exits the motor 50 through a motor outlet 64 and is exhausted to the atmosphere through vents 66 in the housing 20. The vents 66 are located under the lever 34 and indicated schematically in FIG. 2 with dashed lines.

Figure 4:
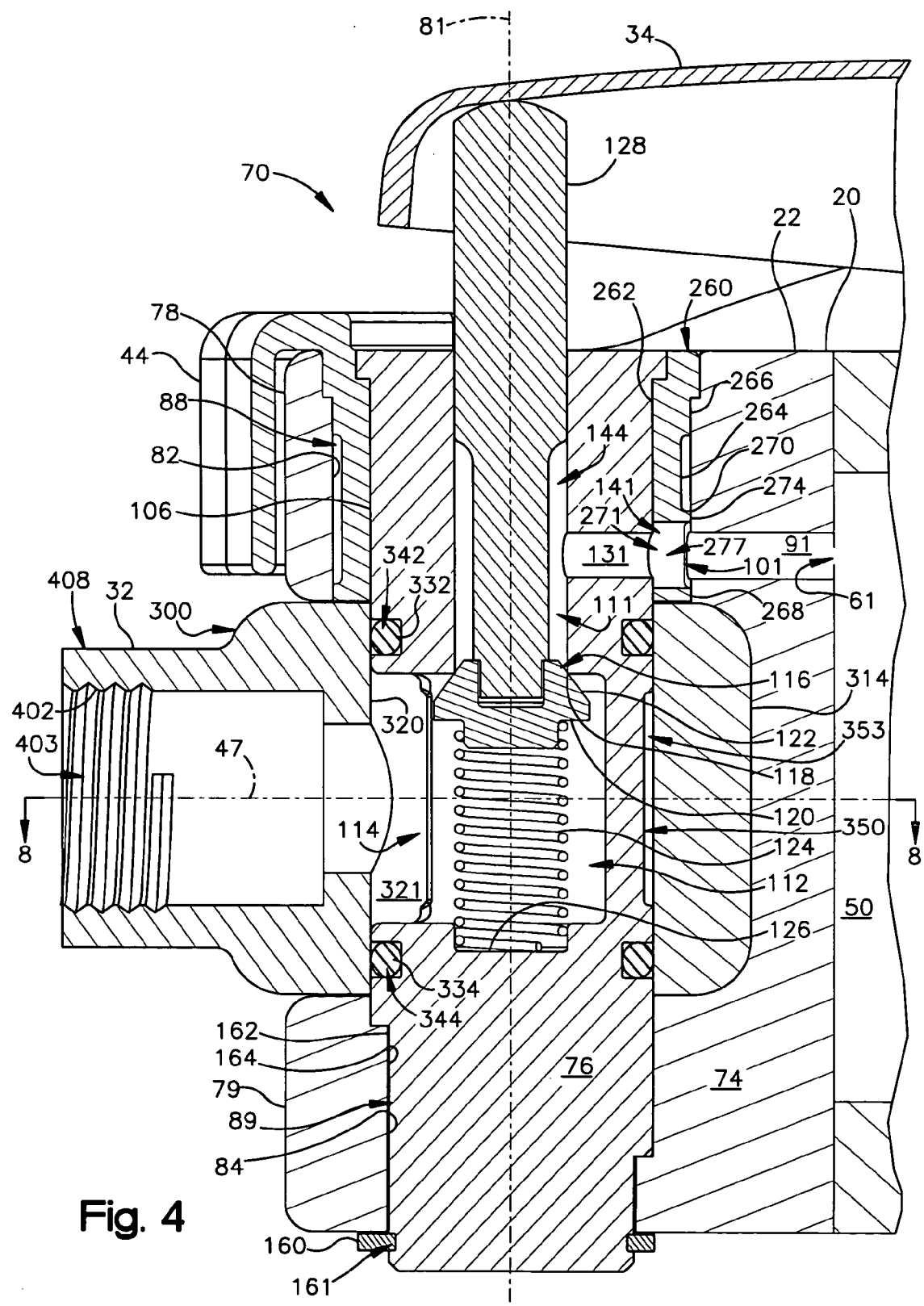
FIG. 4 is a partially schematic sectional view taken at line 4—4 of FIG. 3, showing a valve of the tool in a closed condition.

As shown in FIGS. 3 and 4, the inlet nozzle 32 channels the pressurized air to a valve 70. The valve 70 directs the air to the motor inlets 61 and 62 under control of both the activation lever 34 and the switching arm 44. The valve 70 includes a valve body 74 and a core 76. In this example, the body 74 and the core 76 are formed as two separate components that are subsequently assembled together, but can alternatively be formed as a one-piece structure.

Figure 5:
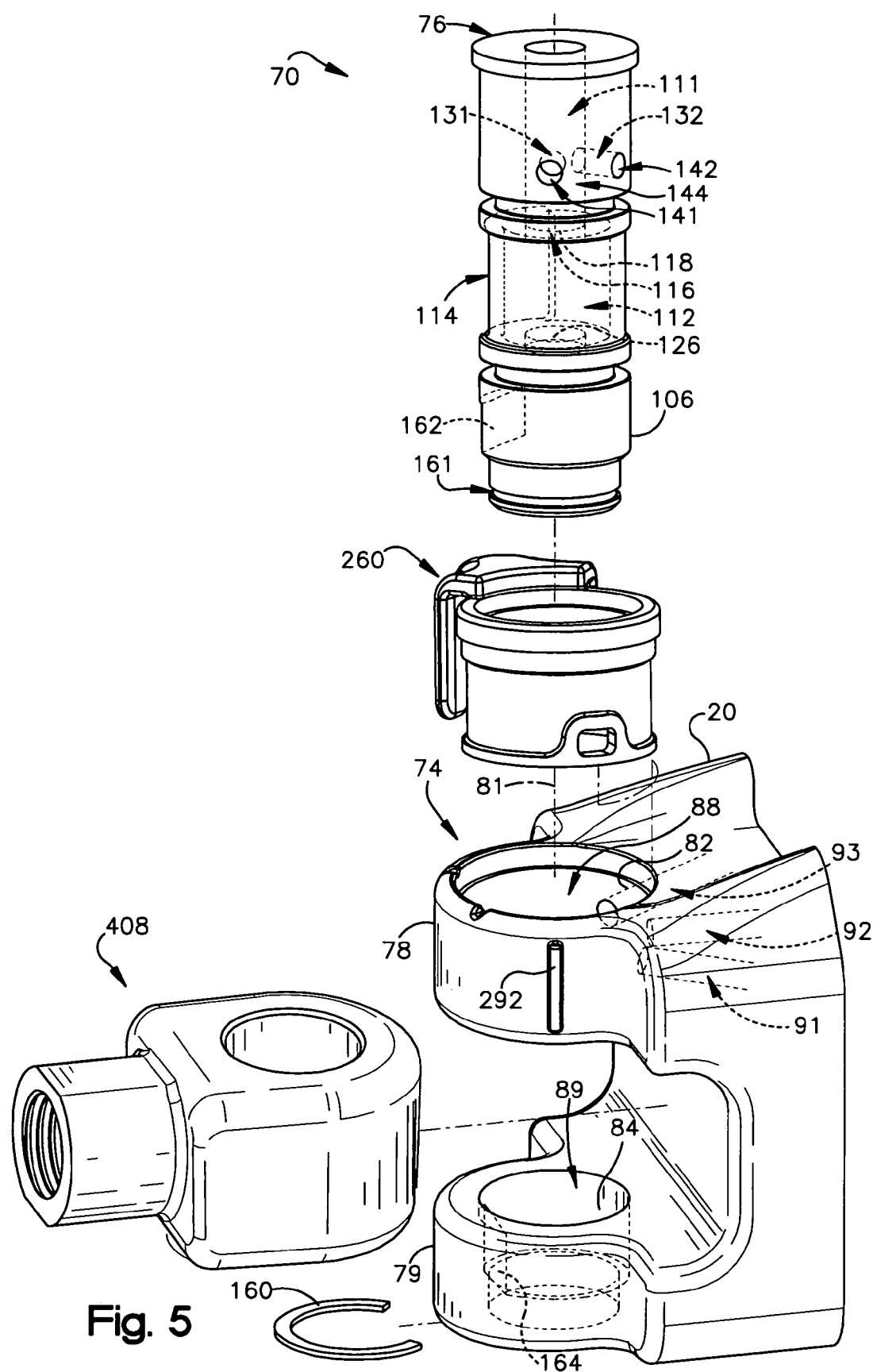
FIG. 5 is an exploded view of parts of the valve.

The valve body 74 is shown in FIG. 5. In this example, it is a part of the housing 20 and is fastened to the remainder of the housing 20. The valve body 74 has upper and lower lobes 78 and 79, located on a valve axis 81. Each lobe 78 and 79 has a radially-inwardly facing cylindrical surface 82 and 84, centered on the axis 81, defining a cylindrical bore 88 and 89. The upper bore 88 is diametrically larger than the lower bore 89.

As shown in FIG. 3, the valve body 74 defines first, second and third body channels 91, 92 and 93 extending from first, second and third body ports 101, 102 and 103. The first and second body channels 91 and 92 communicate with the first and second motor inlets 61 and 62. The third body channel 93 communicates with the air vents, indicated schematically by numeral 66, and thus also with the motor outlet 64 (FIG. 2). The first and second body ports 101 and 102 are circumferentially spaced apart from each other, and the third body port 103 is located circumferentially between them.

The core 76 is shown in FIG. 5. It has a generally cylindrical side surface 106 centered on the axis 81. The core 76 further has upper and lower chambers 111 and 112. As explained above with reference to the "top" and "bottom", this designation of "upper" and "lower" is made with respect to the orientation of the valve 70 as depicted in FIG. 5. The chambers 111 and 112 are centered on the axis 81 and spaced axially apart. An inlet port 114 in the side surface 106 is open to the lower chamber 112. Air can enter the lower chamber 112 through the inlet port 114 and continue on to the upper chamber 111 through an orifice 116. The orifice 116 is surrounded by a valve seat 118 comprising an annular internal edge of the core 76, centered on the valve axis 81.

A plug 120, shown in FIG. 4, is configured to block the air from flowing through the orifice 116. In this case, the plug 120 is an elastomeric plug having a frosto-conical surface 122 configured to sealingly mate with the valve seat 118. The plug 120 is shown in a closed position, sealingly engaged with the valve seat 118. The plug 120 is urged upward into the closed position by pressurized air entering the lower chamber 112 through the inlet port 114. The plug 120 urged upward into the closed position also by a spring 124. The spring 124 is located within the lower chamber 112 and compressed between the plug 120 and a floor 126 of the lower chamber 112. A valve stem 128, centered on the axis 81, is attached to the plug 120. The stem 81 extends from the plug 120 upward through the upper chamber 111 into abutting contact with the activation lever 34.

First and second channels 131 and 132 in the core 76 are shown in FIG. 5. They extend radially outward from the upper chamber 111 to circumferentially-spaced first and second outlet core ports 141 and 142 in the side surface 106. The inlet and outlet ports 114, 141 and 142 of the core 76 are interconnected by a channel system 144 within the core 76. The channel system 144 includes the upper and lower chambers 111 and 112, the orifice 116 between them, and the first and second core channels 131 and 132.

As shown in FIG. 4, the core 76 is received in the bores 88 and 89 of the valve body 74. The lower body surface 84 engages the core side surface 106 about the entire circumference of the core side surface 106. The upper body surface 82 is facing, and spaced from, the core side surface 106. Upward movement of the core 76 is prevented by a retaining ring 160 that snaps into a groove 161 in the side surface 106 of the core 76. Rotation of the core 76 is prevented by a flat 162 in the core 76 that firmly engages a corresponding flat 164 in the valve body 74. This prevents axial and rotational movement of the core 76 relative to the valve body 74. The body 74 and the core 76 are thus fixed together.

An annular sleeve 260 is shown in FIG. 6. It has radially inner and outer surfaces 262 and 264 and upper and lower annular rims 266 and 268. The sleeve 260 further has a passage structure 270 surrounding an opening 271 in the inner surface 262. In this example, the passage structure 270 includes a U-shaped lip 274 and a portion of the lower rim 268. The passage structure 270 defines a passage 277 extending, through the sleeve 260, radially outward from the opening 271 in the inner surface 262.

As shown in FIGS. 3 and 4, the sleeve 260 is located in the upper body bore 88. The sleeve 260 extends circumferentially about the core 76 and is rotatable about the axis 81 relative to the core 76. The sleeve inner surface 262 engages the core surface 106 about the entire circumference of the core surface 106. The sleeve outer surface 264 is facing and spaced from the upper body surface 82. The upper and lower rims 266 and 268 of the sleeve 260 are located across the ports 101, 102, 103, 141 and 142 from each other. The upper and lower rims 266 and 268 are air blocking structures, extending from the sleeve outer surface 264 to the body surface 82, that block fluid from axially escaping from between the sleeve outer surface 264 and the body surface 82.

Like the upper and lower rims 266 and 268, the U-shaped lip 274 extends from the core surface 106 to the body surface 82. The passage structure 270 thus surrounds the passage 277 from the core surface 106 to the body surface 82, thereby isolating the passage 277 from fluid outside the passage 277. The alignment of the passage 277 is circumferentially selectable by rotation of the passage 277 with the sleeve 260 about the axis 81.

The switching arm 44 is fixed to, and preferably a one-piece structure with, the sleeve 260. The arm 44 is thus rotatable with the sleeve 260 about the axis 81. The range of rotation is limited by abutting contact of the arm 44 with first and second bosses 291 and 292 that project from the valve body 74. The arm 44 extends outward from the body 74 and the housing 20 to enable a user to manually rotate the arm 44 to thereby rotate the sleeve 260.

A second sleeve 300 is shown in FIG. 7. It has top and bottom surfaces 304 and 306 and a side surface 310. The side surface 310 includes first, second and third flat sections 311, 312 and 313, and an arcuate section 314 extending partially about the axis 81. A cylindrical inner surface 320 of the sleeve 300 defines a bore 321.

As shown in FIG. 4, the second sleeve 300 is received about the core 76 and is rotatable about the axis 81 relative to the valve body 74. It is vertically captured between the upper and lower lobes 78 and 79 of the valve body 74. This positions the second sleeve 300 such that it overlies the inlet port 114 of the core 76. Upper and lower O-rings 332 and 334 are seated in respective annular grooves 342 and 344 in the core side surface 106, located across the inlet port 114 from each other. The O-rings 332 and 334 thus seal the second sleeve 300 to the core 76 about the full circumference of core 76 both above and below the core inlet port 114.

The core side surface 106 has a circumferentially extending undercut 350 located axially between the O-ring grooves 332 and 334. This provides a circumferential flow space 353 bounded by the inner surface 320 of the sleeve 300 and the side surface 106 the core 76. The circumferential flow space 353 is sealed from above and below by the upper and lower O-rings 332 and 334.

The nozzle 32 is tubular, with an inner surface 402 defining a nozzle bore 403. The nozzle 32 projects radially outward from the second sleeve 300, and the nozzle bore 403 extends radially outward from the bore 321 of the sleeve 300. In this example, the nozzle 32 and the sleeve 300 are molded together as a one-piece inlet structure 408.

Figure 8:
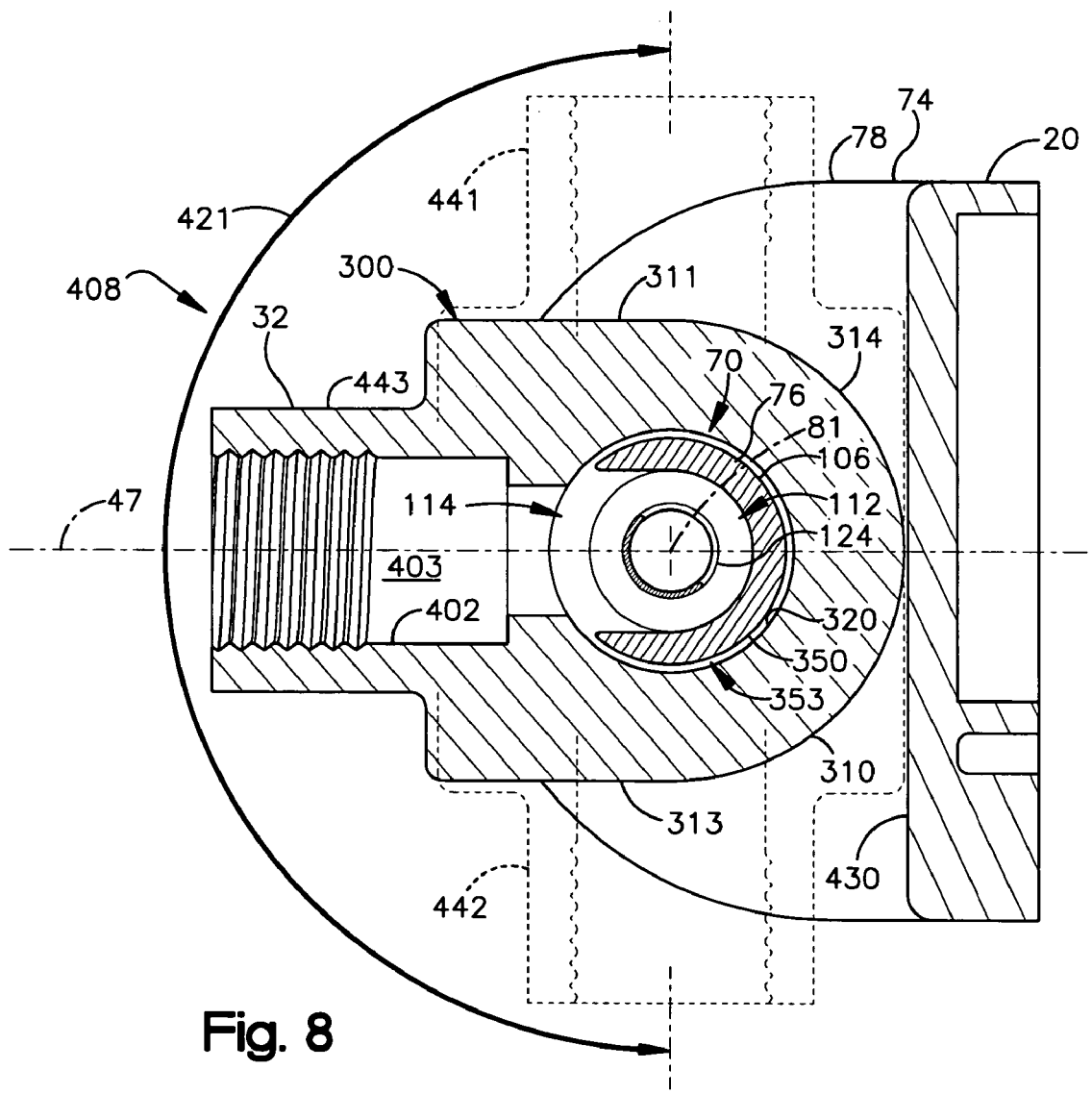
FIG. 8 is a sectional view taken at line 8—8 of FIG. 4, illustrating rotation of the inlet structure.

As shown in FIG. 8, the nozzle 32 is rotatable with the second sleeve 300 into a range of positions indicated by arrow 421. The range is limited by abutment of the first and third side surface sections 311 and 313 of the sleeve 300 with an abutment surface 430 the housing 20. The range is about 180 degrees. It extends from a first end position 441 to a second end position 442, with a center position 443 in-between. Throughout the range of positions, the nozzle 32 communicates with the core inlet port 114 through the sleeve 300.

In its center position 443, the nozzle 32 extends directly rearward from the rear end 28 (FIG. 1) of the housing 20. The nozzle 32 and the nozzle bore 403 are located on and extend along the rotational axis 47 of the anvil 40 (FIG. 2). The nozzle bore 403 is aligned with the inlet port 114, so that air can flow directly through the nozzle bore 403 into the core inlet port 114.

In contrast, in the two end positions 441 and 442 of the nozzle 32, the nozzle bore 403 is not aligned with the inlet port 114. But the nozzle 32 still communicates with the inlet port 114 through the circumferential flow space 353 between the second sleeve 300 and the core 76.

Operation of the tool 10 is described as follows. First, the valve 70 is in a closed condition shown in FIG. 4, in which the plug 120 is biased by the spring 124 toward its closed position.

Figure 9:
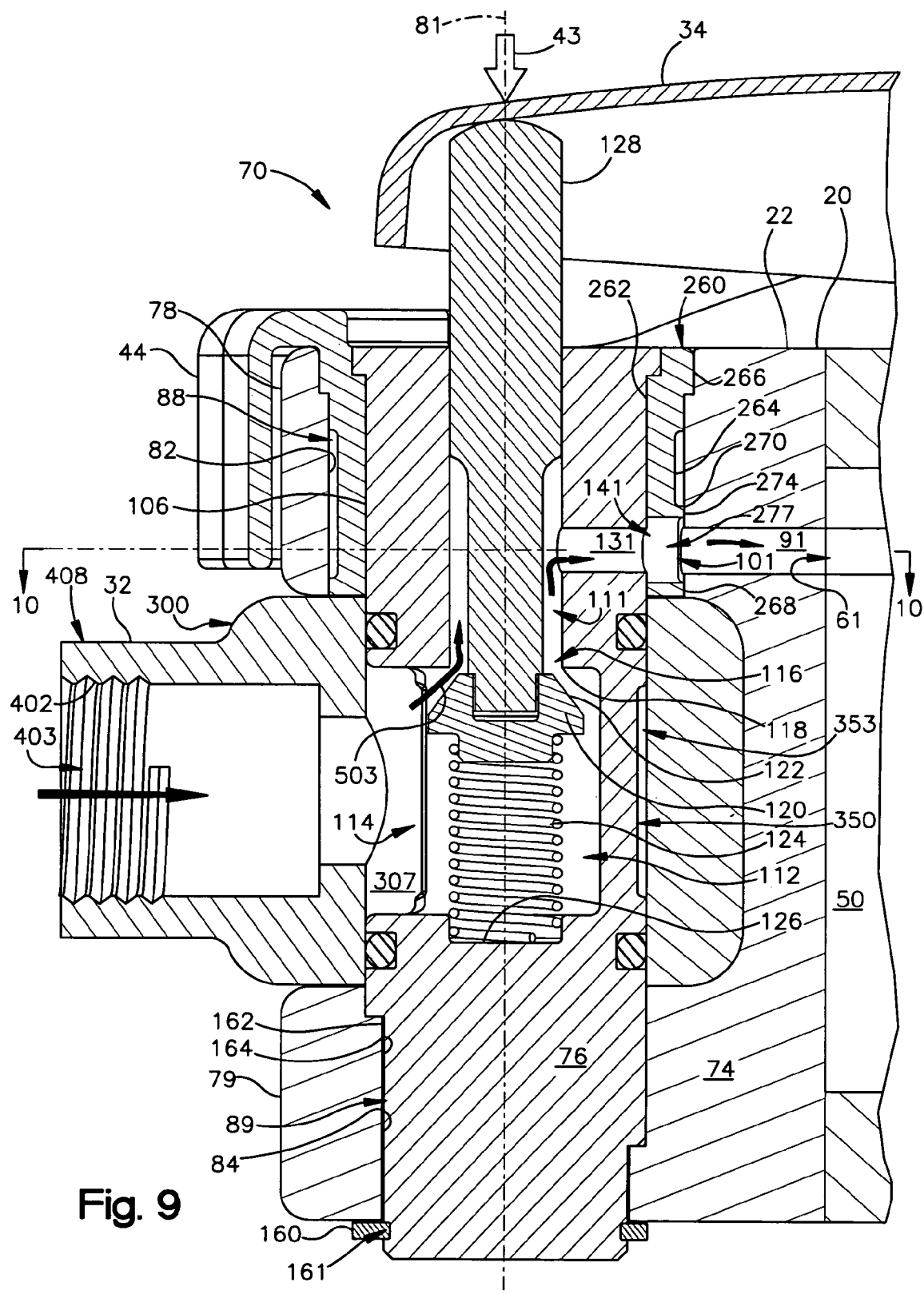
FIG. 9 is a sectional view similar to FIG. 4, showing the valve in an open condition.

Next, the valve 70 is shifted from the closed condition into an open condition shown in FIG. 9. This is achieved by depressing the lever 34, as indicated by arrow 43, to push the stem 128 axially downward. The stem 128, in turn, pushes the plug 120 downward from its closed position into an open position, against bias of both the spring 124 and the air pressure in the lower chamber 112. This enables air to flow from the lower chamber 112 through the orifice 116 into the upper chamber 111, as indicated by arrow 503.

Figure 10:
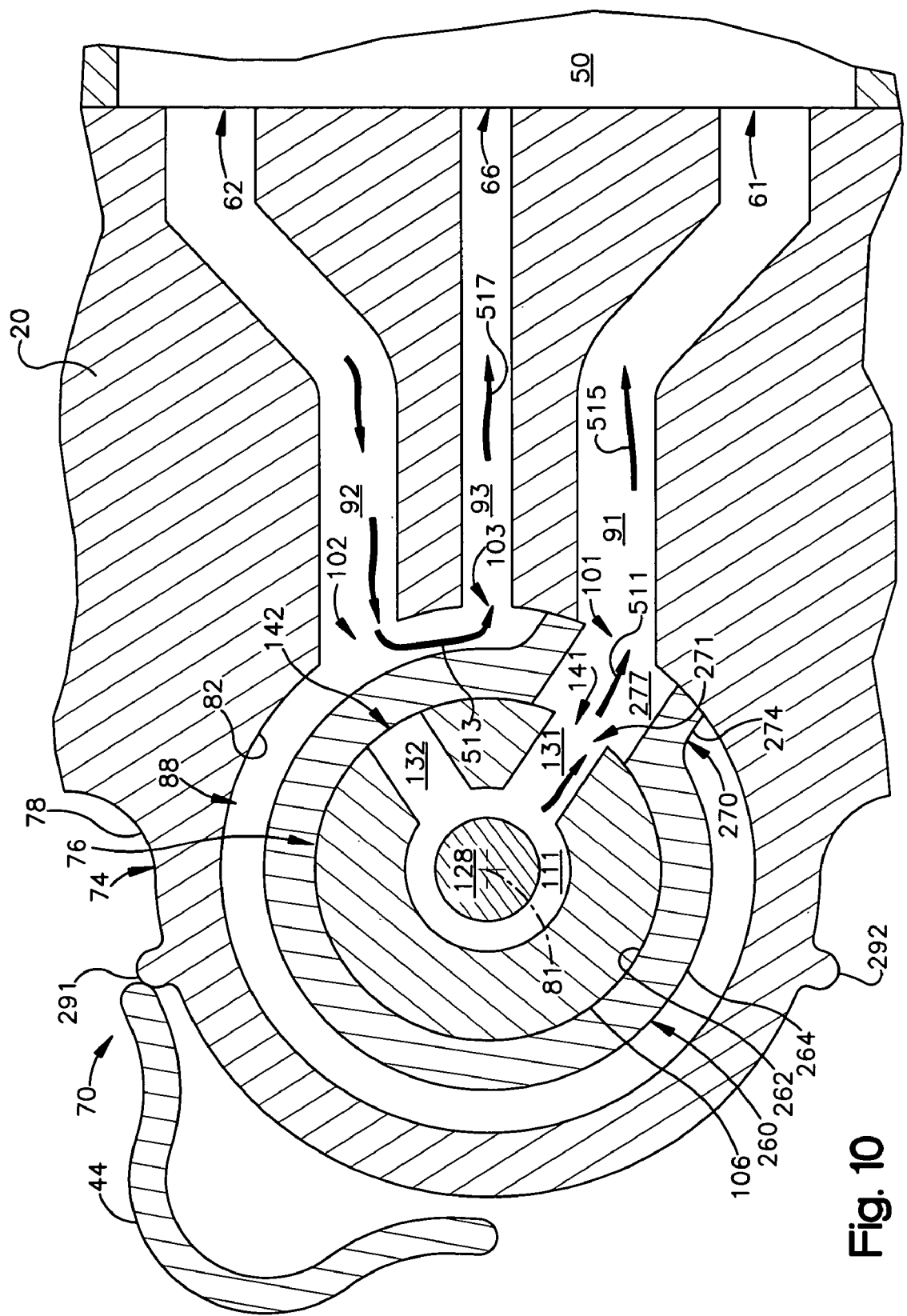
FIG. 10 is a sectional view taken at line 10—10 of FIG. 9, with the sleeve in a first position.

As shown in FIG. 10, the air can exit the upper chamber 111 via the first or second core ports 141 and 142. However, one or both of the core ports 141 and 142 may be blocked by the first sleeve 260, depending on the angular position of the sleeve 260. The angular position of the sleeve 260 is in turn governed by the angular position of the arm 44.

For example, when the arm 44 abuts the first boss 291 as shown in FIG. 10, the first sleeve 260 is in a first position. In this position of the sleeve 260, the sleeve inner surface 262 blocks the second core port 142. But the first core port 141 is not blocked, because the passage 277 of the sleeve 260 is aligned with both the first core port 141 and the first body port 101. This first position of the sleeve 260 provides a first radial flow path 511 and a first circumferential flow path 513, which are isolated from each other by the passage structure 270.

The first radial flow path 511 extends from the first core port 141, through the passage 277, to the first body port 101. This flow path 511 is part of a longer flow path 515 of pressurized air extending from the inlet nozzle 32 (FIG. 4) to the first motor inlet 61 to power the motor 50 to drive the anvil 40 in the forward direction.

The first circumferential flow path 513 extends from the second body port 102 to the third body port 103, bounded radially by the sleeve outer surface 264 and the body surface 82. This flow path 513 is part of a longer flow path 517 extending from the second motor inlet 62 to the housing vents 66, by which air from the second motor inlet 62 can escape to the atmosphere.

Figure 11:
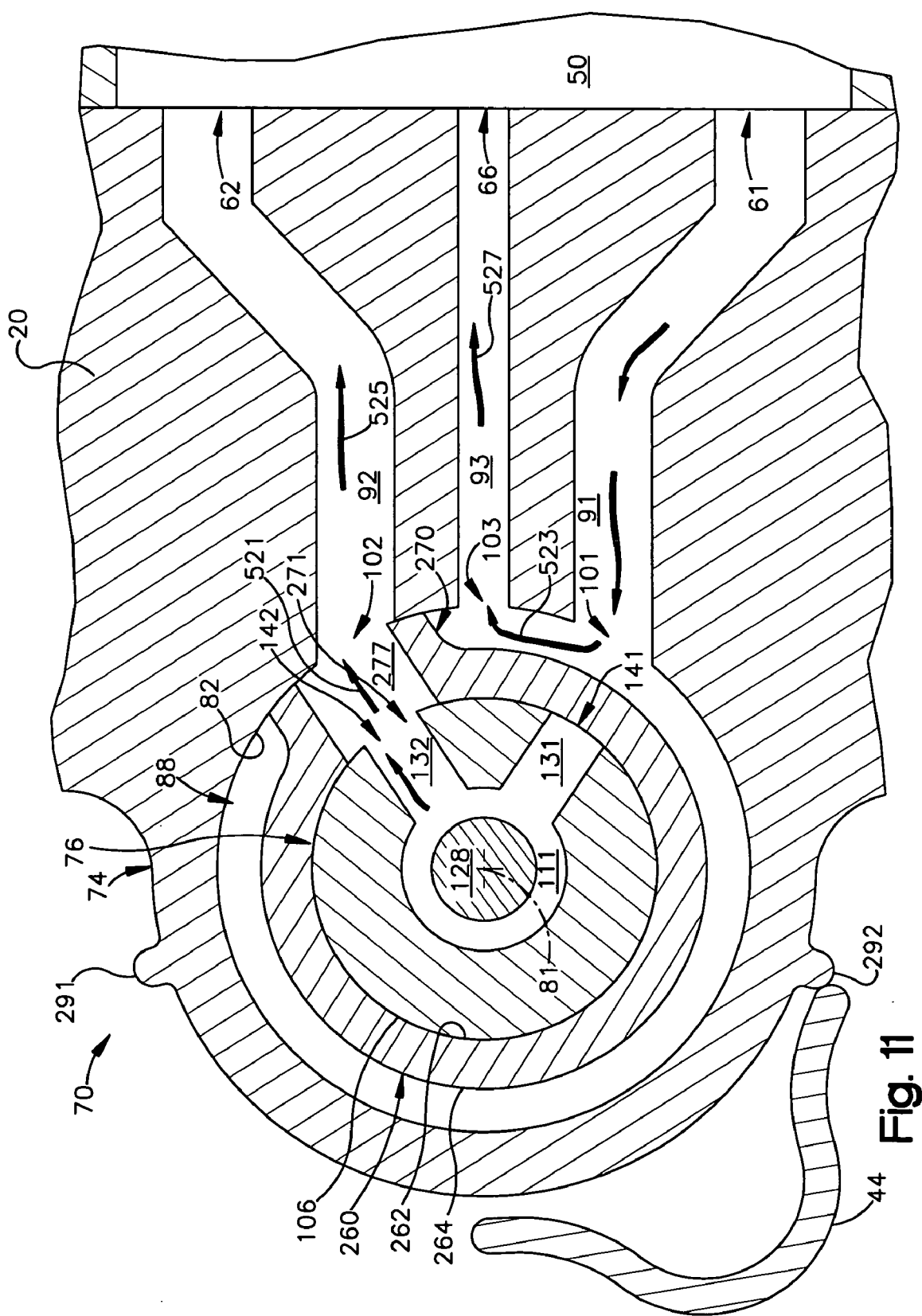
FIG. 11 is a view similar to FIG. 10, with the sleeve in a second position.

The sleeve 260 can be rotated to a second position shown in FIG. 11 by manually pushing the switching arm 44 to rotate it into abutment with the second boss 292. In this second position, the sleeve 260 blocks the first core port 141. But the second core port 142 is not blocked, because the passage 277 is aligned with both the second core port 142 and the second body port 102. This position of the sleeve 260 provides a second radial flow path 521 and a second circumferential flow path 523, which are isolated from each other by the passage structure 270.

The second radially-extending flow path 521 extends from the second core port 142, though the passage 277, to the second body port 102. It is part of a longer flow path 525 of pressurized air extending from the inlet nozzle 32 (FIG. 4) to the second motor inlet 62 to power the motor 50 to drive the anvil 40 in the reverse direction.

The second circumferentially-extending flow path 523 extends from the first body port 101 to the third body port 103, bounded radially by the sleeve outer surface 264 and the body surface 82. This flow path 523 is part of a longer flow path 527 extending from the first motor inlet 61 to the housing vents 66, by which air from the first motor inlet 61 can escape to the atmosphere.

Figure 12:
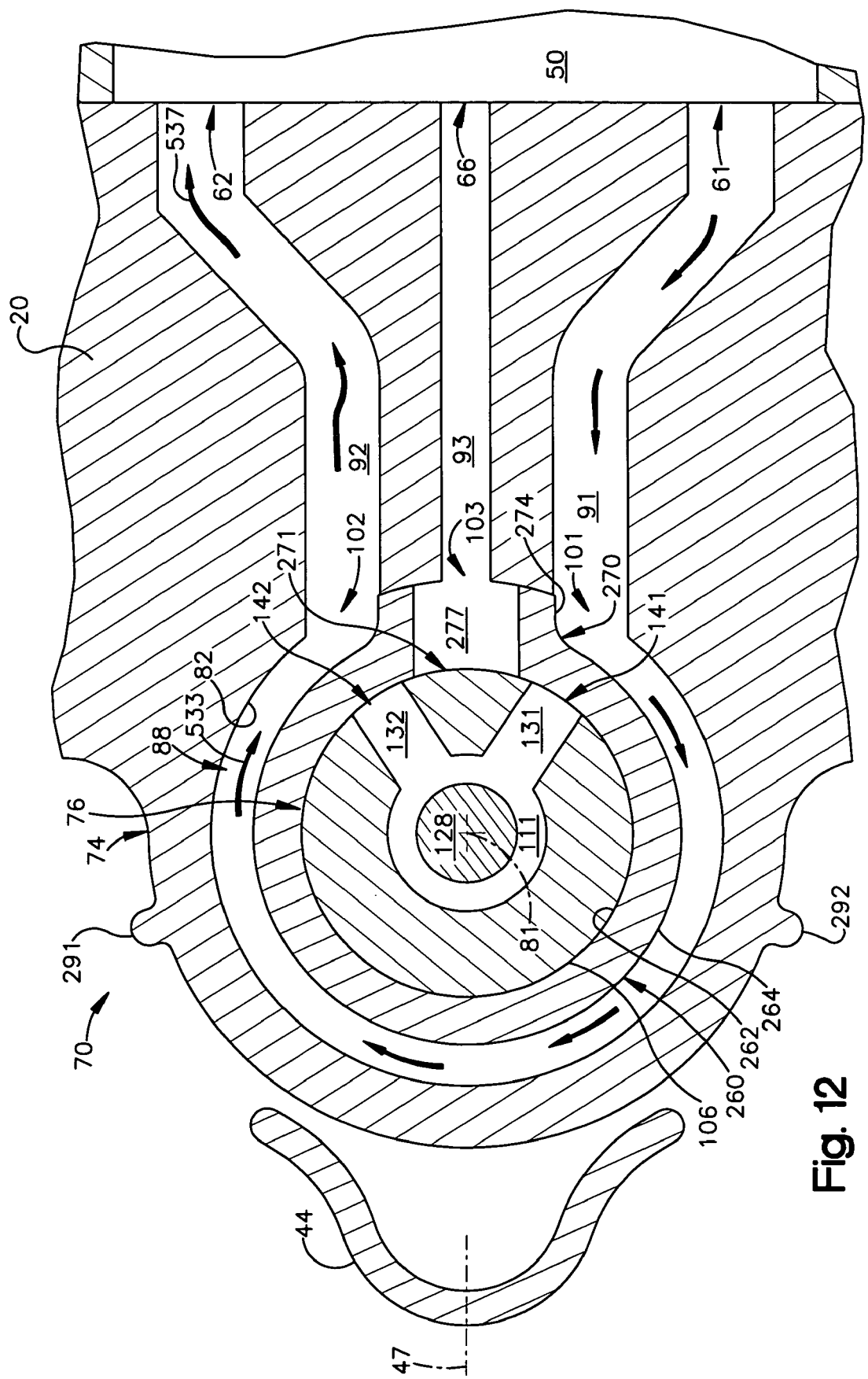
FIG. 12 is a view similar to FIG. 10, with the sleeve in a third position.

The sleeve 260 can be further rotated to a neutral third position shown in FIG. 12. This is done by manually rotating the arm 44 so that it is circumferentially centered between the bosses 291 and 292 and also circumferentially centered on the housing axis 47. In this third position, the sleeve 260 blocks both core ports 141 and 142. However, a third circumferential flow path 533 extends, between the sleeve 260 and the body surface 82, from the first body port 101 to the second body port 102. This flow path 533 is isolated from the upper chamber 111 by the sleeve 260, and also from the passage 277 by the passage structure 270. This flow path 533 is part of a longer flow path 537 extending from the first motor inlet 61 to the second motor inlet 62.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. An apparatus comprising:
   a valve body having a cylindrical bore centered on an axis;
   a cylindrical core extending axially within the bore and fixed relative to the valve body;
   a sleeve within the bore extending circumferentially about the core and rotatable about the axis relative to the core;
   a passage extending radially through the sleeve and providing a radial flow path from the core through the passage to the valve body, alignment of the passage being circumferentially selectable by rotation of the passage with the sleeve about the axis;
   a tool housing interconnected with the body, the core and the sleeve as parts of a unitary handheld tool; and
   a switching arm fixed to the sleeve and extending outward from the valve body and the housing to enable the sleeve to be rotated by manually rotating the arm.

2. An apparatus comprising:
   a valve body having a cylindrical body surface that defines a cylindrical bore centered on an axis and that has first and second body ports circumferentially spaced apart;
   a cylindrical core extending axially within the bore and fixed relative to the valve body; and
   a sleeve, within the bore, extending circumferentially about the core, and including a radially inner surface engaging the core, a radially outer surface facing and spaced from the body surface, a passage extending radially through the sleeve and providing a radial flow path from the core through the passage to die valve body, and a passage structure surrounding the passage from the core to the body surface, the sleeve being rotatable about the axis relative to the core between a first, second and third positions;

the first position providing a first radial flow path extending from the core through the passage to the first body port;

the second position providing a second radial flow path extending from the core through the passage to the second body port; and the third position providing a circumferential flow path extending from the first body port to the second body port, between the sleeve outer surface and the body surface.

3. An apparatus comprising:

a valve body having a cylindrical body surface that defines a cylindrical bore centered on an axis and that has first, second and third body ports circumferentially spaced apart;

a cylindrical core extending axially within the bore and fixed relative to the valve body;

a sleeve, within the bore, extending circumferentially about the core, the sleeve including a radially inner surface engaging the core, a radially outer surface facing and spaced from the body surface, a passage extending radially through the sleeve and providing a radial flow path from the core through the passage to the valve body, and a passage structure surrounding the passage from the core to the body surface, the sleeve being rotatable about the axis relative to the core between first and second positions;

the first position providing a first radial flow path extending from the core through the passage to the first body port and a first circumferential flow path extending from the second body port to the third body port;

the second position providing a second radial flow path extending from the core through the passage to the second body port and a second circumferential flow path extending from the first body port to the third body port, with both circumferential flow paths bounded by the sleeve outer surface and the body surface and isolated from the passage by the passage structure; and a tool housing, a bi-directional air motor, an output shaft, and a vent to the atmosphere that are interconnected with the body, the core and the sleeve as parts of a unitary handheld tool, wherein the motor has first and second inlets for receiving pressurized air to power the motor to drive the shaft respectively in forward and reverse directions, the first and second motor inlets respectively communicate with the first and second body ports, and the vent communicates with the third body port.

4. An apparatus comprising:

a valve body having a cylindrical bore centered on an axis;

a cylindrical core extending axially within the bore and being fixed relative to the valve body, the core having an inlet core port, an outlet core port, a channel system within the core, and an orifice in the channel system, with the inlet core port communicating with the outlet core port through the channel system and through the orifice;

a sleeve within the bore, extending circumferentially about the core, overlying the outlet care port and rotatable about the axis relative to the core;

a passage extending radially through the sleeve and providing a radial flow path from the outlet core port through the passage to the valve body, alignment of the passage being circumferentially selectable by rotation of the passage with the sleeve about the axis;

a plug; and a spring that urges the plug into a closed position in which the plug closes the orifice.

5. The apparatus of claim 4 further comprising a valve stem extending axially from the plug past the outlet core port to a location outside the valve body to enable displacing the plug from its closed position by axially displacing the stem.

6. The apparatus of claim 4 wherein the plug is configured to be urged into the closed position by air entering the core through the inlet core port.

7. An apparatus comprising:

a valve body having a cylindrical bore centered on an axis;

a cylindrical core extending axially within the bore and fixed relative to the valve body, the core having an inlet core port, an outlet core port, and a channel system within the core through which the inlet core port communicates with the outlet core port;

a first sleeve within the bore, extending circumferentially about the core, overlying the outlet core port and rotatable about the axis relative to the core;

a passage extending radially through the first sleeve and providing a radial flow path from the outlet core port through the passage to the valve body, alignment of the passage being circumferentially selectable by rotation of the passage with the first sleeve about the axis;

a second sleeve extending circumferentially about the core, overlying the inlet core port and rotatable about the axis relative the core; and a nozzle projecting radially outward from the second sleeve and being rotatable with the second sleeve into a range of positions in which the nozzle communicates with the inlet core port through the second sleeve.

8. The apparatus of claim 7 further comprising a circumferential flow space bounded by the second sleeve and the core, through which the nozzle can communicate with the inlet port when the nozzle is rotated to a position in which the nozzle is not aligned with the inlet core port.

* * * * *